United States Patent [19]

Munsterman et al.

[11] 4,403,489
[45] Sep. 13, 1983

[54] STRIP WINDING MACHINE AND METHOD

[75] Inventors: Ronald S. Munsterman, Shawnee Township, Allen County; Homer C. Bowers, Lima, both of Ohio

[73] Assignee: Westinghouse Electric Corp., Pittsburgh, Pa.

[21] Appl. No.: 254,676

[22] Filed: Apr. 16, 1981

[51] Int. Cl.³ ........................ H02K 15/04; B21C 47/00
[52] U.S. Cl. .......................................... 72/16; 29/596; 29/605; 29/609; 72/131; 72/148
[58] Field of Search ................. 29/596, 598, 605, 609; 242/56.8; 72/131, 132, 146–148, 16

[56] References Cited

U.S. PATENT DOCUMENTS 2,200,425  5/1940  Kunrsteiner ...................... 29/605 X
3,140,545  7/1964  Murtland, Jr. ...................... 72/16 X
4,320,645  3/1982  Stanley ............................ 29/598 X Primary Examiner—Carl E. Hall
Attorney, Agent, or Firm—William D. Lanyi

[57] ABSTRACT

A method and apparatus for winding axial air gap motor cores, using prepunched strip material, so that the finished cores have radially aligned slots. The invention includes a precise movement of the winding mandrel away from the punching means to gradually increase the interslot gap for each slot. The action of the punch press, mandrel rotation and linear mandrel motion are coordinated to prevent interference among these activities. The method of interslot gap sizing provides for proper radial slot alignment when the prepunched strip material is later wound on the mandrel.

12 Claims, 4 Drawing Figures

STRIP WINDING MACHINE AND METHOD

BACKGROUND OF THE INVENTION

This invention relates to the spiral wrapping of a strip of material around an axis and, more specifically, to the winding of a prepunched strip of material around a rotating mandrel in order to produce a motor core with radial slots.

A spirally wound core with radial slots is a requirement for the stator of an axial airgap motor. The cores are produced by winding a long, thin strip of steel around a mandrel or arbor. As the strip is wrapped around the rotating mandrel, the radial thickness of the toroidally shaped core continually increases until the finished size is achieved.

Since motor stators are designed to allow conductive coils to be wound within them, they are typically equipped with a plurality of radial slots in one axial face of the core. There are two ways to produce a core with radial slots. One way is to wind a slotless core and then machine the radial slots after it is wound. An alternative is to punch the slot shape into the metal strip with a punch press before winding so that the consecutive punched layers of the metal strip form the radial slots by aligning themselves with corresponding slots in preceding, radially inboard layers as the core is wound.

The machining method has two significant negative characteristics inherent in its use. It is very costly since it requires two separate and distinct serial operations to be performed on the core and, secondly, the resulting machined inner surfaces of the radial slots are not ideal for motor core performance. These inner surfaces, which are intended to be made up of many individual thin edges of the strip material, tend to become smooth and homogeneous from the machining operation, significantly worsening the eddy current loss characteristics of the core.

The prepunching alternative is made difficult by the ever increasing diameter of the core as it is being wound on the mandrel. Since each layer of material is wrapped around all preceding layers, its effective diameter is larger than that of previous layers with a resulting larger circumference. Each of the radial slots passes through each layer one time and, therefore, the number of slots through each layer is identical to that of every other layer. Because of the above-mentioned increasing circumference of outer layers and the slot number identity, the distance between each slot in the strip of material must be increased from that of the preceding slots. If these increasing dimensions are not accurately maintained, the resulting slots will be skewed instead of radially straight. Although some motor designs require skewed slots, the slots of any motor, whether with radial or skewed slots must be accurately produced according to the motor's design.

Stacking factor is another characteristic of laminated composites which severely exacerbates the skewing problem and is known to those skilled in the art. The stacking factor of a given material is defined as the arithmetic sum of the thicknesses of a selected number of pieces of the material divided by the measured stack height of that selected number of pieces. The stacking factor varies as a function of material thickness, coating and surface condition and is normally less than one.

Existing methods of motor core manufacture compensate for slot skew by coil winding techniques or by designing the overall motor to allow for the inherent inefficiency of skewed stator core slots. The present invention has as its prime objective the winding of axial airgap stator cores, with prepunched strips, that have straight and radial slots and the capability of creating a predetermined amount of skew when that characteristic is desired.

SUMMARY OF THE INVENTION

In order to achieve a core with radial slots that exhibit minimal or no skew, the present invention causes each interslot space in the prepunched strip to be slightly larger than previous interslot gaps by an accurately predetermined distance. Rather than attempting to determine and control the absolute magnitude of these interslot gaps, the present invention precisely accomplishes the relative increase in interslot distance for each slot without regard to its absolute length.

The present invention provides for this relative increase in interslot length by moving the winding mandrel away from the punch press a slight amount prior to each stroke of the punch press. The exact distance that the mandrel is moved is determined as a function of the strip's thickness as measured prior to the punching of the material.

Following each stroke of the punch press, the mandrel is rotated an arcuate distance which is equal to 360 degrees divided by the number of radial slots in the core. This rotation of the mandrel causes a length of strip material to be pulled through the punch press. Simultaneous with this rotation, the mandrel is moved a small distance away from the press. Therefore, the strip moves through the punch press a total amount which is the result of both the arcuate and the linear movement of the mandrel. This total movement provides for the next slot to be punched in a position on the strip material which will align with previously punched slots in a radial configuration.

The two mandrel movements described above provide for two distinct components of each interslot gap. The arcuate motion operates in conjunction with the stacked radial thickness of the partially stacked core to pull a length of strip material which is determined as a function of the number of layers already wound along with the effective stacking factor of those layers. It also compensates for any irregularities, such as bulges, which may exist in the wound layers. These factors do not have to be measured or estimated since their very existence creates the radial distance which is moved over the arcuate path. The linear distance which is pulled by the arcuate motion is therefore the exact distance required for the layer being wound. However, the layer being punched will lie radially outward from the layer being wound. This difference is compensated for by the above mentioned simultaneous linear motion of the mandrel away from the punch press. This linear distance is equal to the result obtained from the equation:

$$\Delta L = 2\pi T / NF$$

where T is the measured thickness of the strip immediately prior to punching, N is the number of radial slots in the core, F is the stacking factor of the punched strip material and $\Delta L$ is the amount that the interslot gap must increase as compared to the previously punched slot's interslot gap in the immediately preceding layer.

By moving the mandrel both arcuately and linearly on every stroke of the punch press, the interslot gap can be progressively increased and radial slots with a minimal controlled skew or no skew are thus produced.

BRIEF DESCRIPTION OF THE DRAWINGS

The present invention will be more fully understood from the following detailed description of the preferred embodiment read in conjunction with the following figures, in which.

DESCRIPTION OF THE PREFERRED EMBODIMENT

The present invention relates to the winding of a prepunched strip of material in such a way as to align the punches radially in the wound assembly and, more particularly, to the punching and winding of stator cores for axial air gap motors.

Figure 1:
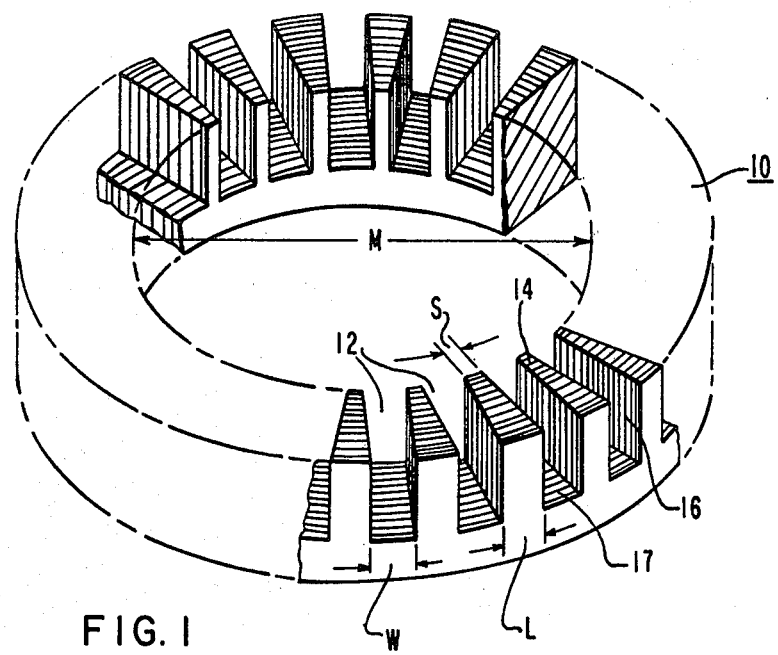
FIG. 1 is an illustration of a typical stator core for an axial air gap motor which the present invention is capable of winding.

FIG. 1 depicts a typical core 10 which the present invention is designed to produce. It is a laminated toroid produced by repeatedly wrapping a strip of material around a mandrel which is approximately the size of the core's inside diameter M. The strip of material has slots 12 prepunched into it which are spaced in such a way that, when wound, the slots 12 align radially as shown in FIG. 1. The slots 12 are depicted as being generally rectangular but it should be apparent from the following discussion that slots of virtually any geometric shape can be accomodated by the present invention if they are suitable for punching by a punch press. The characteristic which makes this type of core 10 difficult to manufacture is the varying interslot gap 14 which varies from its minimum dimension S at the inside diameter to its maximum dimension L at its outside diameter. Although the slot dimensions and shape (e.g. width W in this example) remain constant, the interslot gap 14 must continuously increase as the core 10 is wound. It should be apparent to one skilled in the art that if the interslot gap were to remain constant throughout the winding operation the slots would be skewed instead of radially straight as shown in FIG. 1. In cases where no skew is desirable, the characteristics of the resultant core would be negatively affected if the slots were inadvertently skewed. It should also be apparent that if the slots were machined after winding, as an alternative to the present invention, the internal slot walls 16 and 17, would be physically altered in such a way as to deleteriously affect the core's eddy current characteristics. It is therefore beneficial, both economically and in view of the core's electrical properties, to wind the core after punching the slots. The present invention allows for the accurate alignment of these prepunched slots and the above-described advantages inherent in this method.

Figure 2:
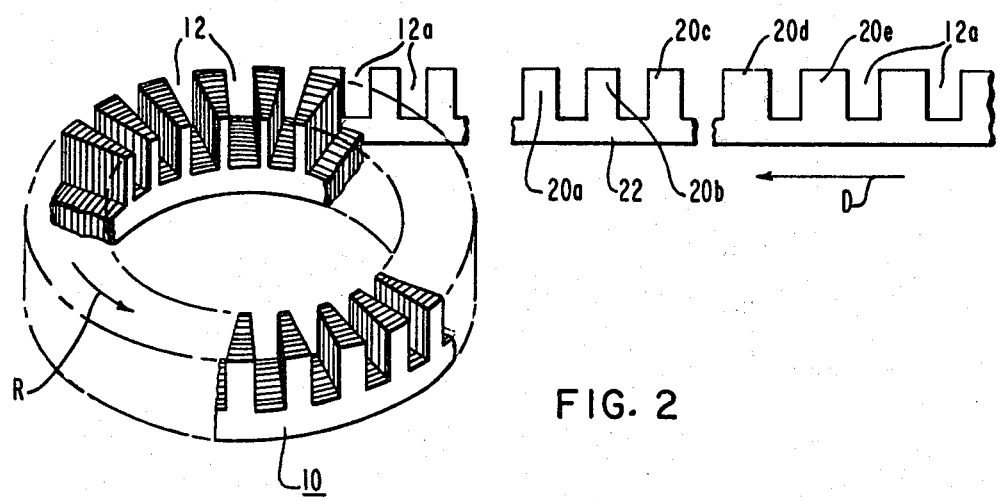
FIG. 2 is a depiction of an axial air gap motor stator core showing the prepunched strip material with unequally spaced slots punched thereon.

To further elaborate on the specific requirements of machines which perform the function of the present invention, FIG. 2 shows a core 10 as it would appear during the winding operation. In order for the slots 12 to align radially in the wound portion of the core, the prepunched slots 12a must be positioned relative to each other in such a way as to provide for continuously expanding interslot gaps 20a through 20e, as shown. The strip 22 is wound in the direction D in conformance with the rotation of the wound portion of the core 10 in direction R. As explained above, the interslot gap 20b must be incrementally larger than the prior one 20a. This progression continues throughout the entire length of the strip 22, 20c being larger than 20b, 20d being larger than 20c and so on until the core is completely wound.

Figure 3:
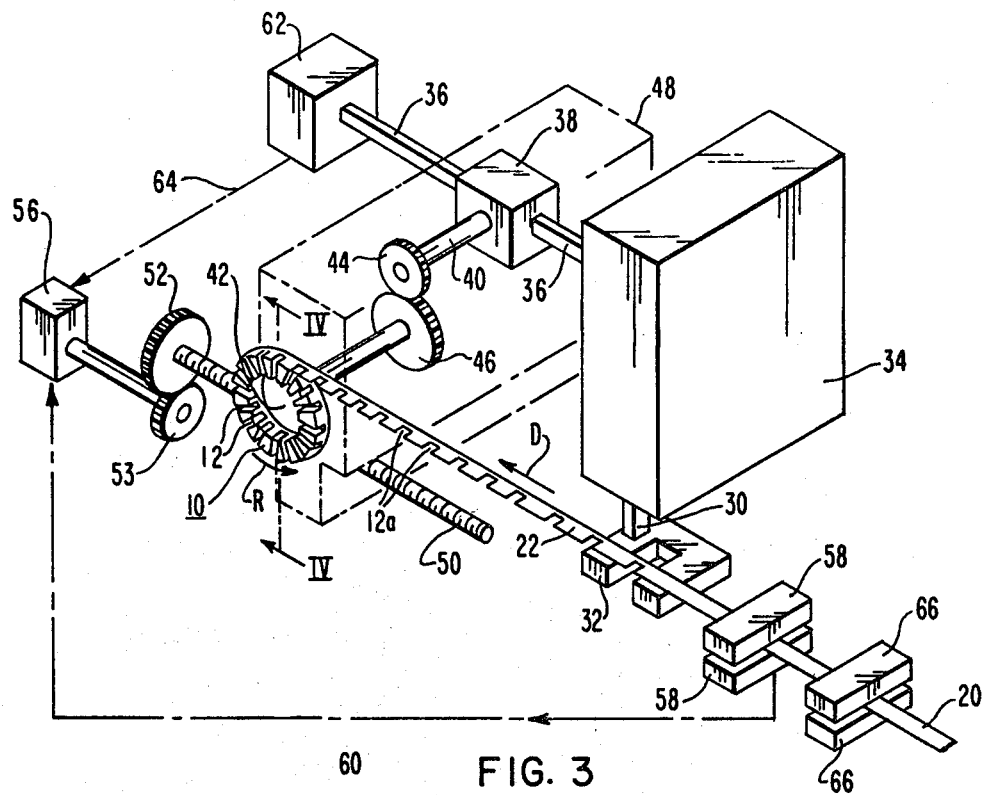
FIG. 3 is an exemplary illustration of the present invention.

FIG. 3 depicts an exemplary layout of the present invention. A strip 22 of material is fed through the punch 30 and die 32 of a punch press 34 which sequentially punches slots 12a into the strip 22. The punch press 34 causes a rotation of shaft 36 with each stroke of the punch 30. The shaft 36 is connected to an intermittor 38 which produces one-half revolution of shaft 40 followed by a dwell for each revolution of shaft 36. Shaft 40 is connected to the mandrel 42 through gears 44 and 46. The ratios of the intermittor 38 and gears 44 and 46 are chosen to provide a rotation of the mandrel 42 that equals the desired arcuate distance between radial slots 12 for each stroke of the punch 30. The intermittor 38, gears 44 and 46 and mandrel 42 are all shown, in FIG. 3, mounted in a frame 48. It should be apparent from this exemplary drawing that, for each arcuate movement of the mandrel 42 in the direction R, the strip 22 is caused to be pulled through the punch 30 and die 32 of the punch press 34 for a distance determined solely by the momentary radius of the partially wound core 10 and the arcuate movement of the mandrel 42. The mandrel 42, connected to the frame 48, is also caused to linearly move away from the punch 30 in the direction D by a leadscrew 50 threaded through the frame 48. One end of the leadscrew is connected to a stepping motor 56 through gears 52 and 53. One stepping pulse of the stepping motor 56 will move the mandrel 42 a specific distance away from the punch 30. This specific incremental distance can be accurately determined by an appropriate choice of the ratios of gears 52 and 53 and the thread pitch of the leadscrew 50.

Prior to its beng punched, the thickness of the strip 22 is measured by a thickness gage 58. The result of this measurement is used to determine the number of stepping pulses which the stepping motor 56 receives following each stroke of the punch 30. Since the variation of strip thickness is generally slow as a function of time, the stepping motor can be adjusted manually based on the output of the thickness gage 58 or automatically, with electronic circuitry, as indicated by the dashed line 60. The result of the thickness measurement determines the amount of movement of the stepping motor 56 and a switching means 62 determines when the stepping motor is activated. Connected to a continuation of the shaft 36 which activates the intermittor 38 is a switching means 62 which sends a signal to activate the stepping motor 56 once for each punch of the punch press 34. This signal, illustrated by dashed line 64, can be a cam activated switch or electronic circuitry.

In order to maintain tautness of the strip 22, a magnetic brake 66 is positioned in front of the thickness gage 58. This brake 66 helps to maintain the dimensional accuracy of both the thickness gage 58 and the punch press 34.

The distance between the mandrel 42 and the punch 30 is generally chosen to be equal to one circumferential distance around the mandrel 42 before the winding operation begins but this distance is not critical to the operation of the present invention. Before the winding operation is commenced, a small number of slots 12a are punched in the strip 22 with an interslot distance equal to that of the innermost core layer. The strip 22 is then secured to the mandrel 42 and the winding operation begins. The strip 22 material wound during this setup operation, which is generally one or two layers, is sacrificial and removed after the core 10 is completely wound. It should be apparent to one skilled in the art that if the slots 12 in the sacrificial layers are aligned properly, the distance between the punch 30 and the mandrel 42 is not a critical dimension since all subsequent movements of the mandrel 42 are relative, and not absolute, as described above.

Figure 4:
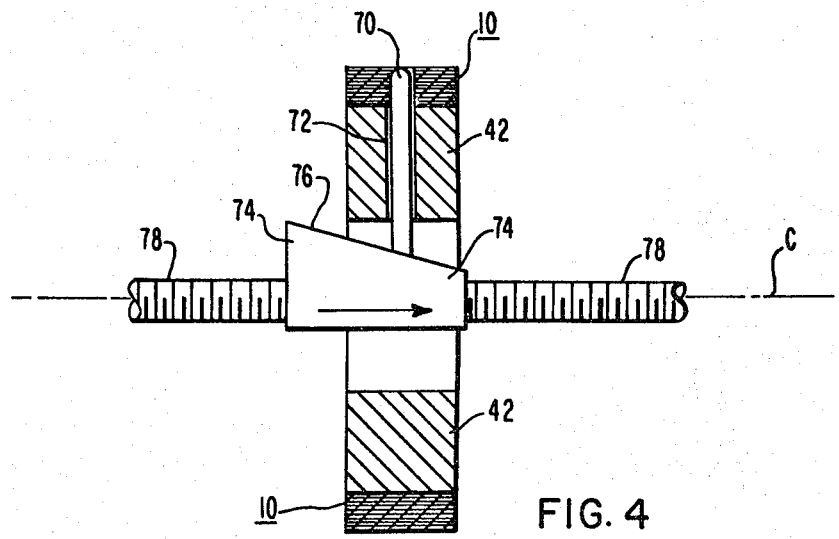
FIG. 4 is a sectional view of the mandrel of FIG. 3.

FIG. 4 is a sectional view of the mandrel 42 of FIG. 3. FIG. 4 shows a pin 70 disposed in a radial hole 72 in the mandrel. The pin 70 is positioned in a manner so as to extend through a radial slot of the core 10, following the initial setup procedure, as it is being wound on the mandrel 42. A wedge 74 is disposed within the mandrel so that a sloped surface 76 of the wedge 74 is in sliding contact with the innermost terminus of the pin 70. As the mandrel 42 turns, the wedge 74 turns with it. A threaded shaft 78 passes through the wedge 74 in such a way that its rotation with the mandrel 42 causes the wedge 74 to move in the direction X and force the pin 70 radially outward through the mandrel and into the core slot. This pin serves the dual purposes of providing a tangential force on the strip and in maintaining an alignment check on the radially aligned slots. Although not an absolute necessity to the proper functioning of the present invention, the pin 70 helps to guarantee the straightness of the resulting radial slots. Any subsequent movement of the slot position relative to the pin 70 will be due to a variation in the strip material's stacking factor. This variation can be visually observed or automatically monitored and the functional relationship between the linear mandrel movement and strip thickness can be altered as shown in the equation described above.

The slope of the surface 76 and the pitch of the threaded shaft 78 are chosen in such a way as to move the pin 70 a radial distance approximately equivalent to the thickness of one layer of the strip material for each revolution of the mandrel. Thus, as the thickness of the core increases, the pin extends radially an amount to provide both alignment and a positive tangential force on the strip.

In the above discussion and illustrations, a simple, rectangular slot shown in FIGS. 1 and 2 was depicted. It should be apparent to those skilled in the art that more complex slot configurations, which are common in axial airgap stators can also be produced on the present invention.

It should be obvious that the present invention provides a means for winding prepunched strip material into a toroidal shape while assuring accurate alignment of radial slots. The present invention accomplishes this by accurately moving the winding mandrel and punch press apart. It should also be obvious that, although the present invention has been described in considerable detail, it should not be construed to be so limited.

The present invention, as disclosed herein, could be applied to produce cores with radial holes passing therethrough as well as the slots, described above, which are coterminal with one axial face of the core. It should be obvious that the utility of the present invention is not dependent on the slot shape, material or punching means, but on its capability of producing wound laminated assemblies with radially aligned discontinuities which have been placed in the strip material prior to the winding operation. It should further be obvious that, when skewed slots are desired, the method and apparatus described herein enable their production in a manner that removes the randomness which is inherent in previous prepunching and winding methods.

What we claim is:

1. A winding machine, comprising:
   means for punching an impression in band-shaped material;
   a rotatable means for winding the punched material;
   means for measuring the thickness of said band-shaped material;
   means for moving said winding means away from said punching means;
   means for adjusting said moving means to move said rotatable winding means in response to said thickness measuring means; and
   means for synchronizing said moving means to said punching means.

2. The winding machine of claim 1, further comprising:
   means for restraining the movement of said band-shaped material.

3. The winding machine of claim 1, wherein said rotatable winding means comprises:
   a rotatable mandrel;
   an intermittor which rotates said mandrel a preselected arcuate distance in response to said punching means; and
   means, disposed in said mandrel, for aligning said impressions.

4. The winding machine of claim 1, wherein said moving means comprises:
   a leadscrew rotatably connected to said winding means;
   a stepping motor connected to said leadscrew;
   means for coordinating said stepping motor to said punching means; and
   means for determining a number of pulses sent to said stepping motor, said number of pulses being determinable from said thickness.

5. An apparatus, comprising:
   a punch press for making a series of impressions in a band of material moving therethrough;
   a rotatable mandrel for winding said band of material into a toroidally shaped core;
   means for rotating said mandrel;
   means for measuring the thickness of said band of material;
   means for moving said mandrel away from said punch press a distance determined as a function of said thickness measurement;
   means for coordinating said rotating means to said punch press; and
   means for coordinating said moving means to said punch press.

6. The apparatus of claim 5, further comprising:
   means for restraining the movement of said band of material through said punch press.

7. The apparatus of claim 5, wherein:
   said rotating means comprises an intermittor.

8. An impressed strip winding machine, comprising:
   a movable frame;

a mandrel rotatably disposed on said frame for winding a strip of material thereupon;

means for rotating said mandrel;

a punch press for punching impressions into said strip of material;

a thickness measuring gage disposed proximate said strip of material for measuring the thickness of said strip of material;

a leadscrew connected to said frame in threaded association;

a motor connected to said leadscrew for rotating said leadscrew a preselected arcuate distance;

means for starting said motor in synchronization with said punch press; and means for determining said preselected arcuate distance as a function of said strip thickness measurement.

9. The machine of claim 8, further comprising:

means for restraining movement of said strip through said punch press.

10. The machine of claim 8, further comprising:

means for feeding a supply of said strip material to said punch press.

11. The machine of claim 8, further comprising:

a pin radially disposed in said mandrel for cooperatively associating with said impressions in said strip material.

12. A method of winding impressed strips, comprising:

punching an impression into a strip of material with a punch press;

rotating a mandrel to which said strip of material is connected;

measuring the thickness of said strip of material;

moving said mandrel away from said punch press a preselected distance, said preselected distance being determined as a function of said thickness of said strip of material; and synchronizing the movement of said mandrel to said punching of said impression.

* * * * *